United States Patent [19]

Murphy et al.

[11] 4,280,827
[45] Jul. 28, 1981

[54] SYSTEM FOR MEASURING OPTICAL WAVEGUIDE FIBER DIAMETER

[75] Inventors: Edward F. Murphy, Wrightsville Beach, N.C.; James R. Portzer, Big Flats, N.Y.

[73] Assignee: Corning Glass Works, Corning, N.Y.

[21] Appl. No.: 72,011

[22] Filed: Sep. 4, 1979

[51] Int. Cl.³ .............................................. C03B 37/02
[52] U.S. Cl. ...................................... 65/11 W; 65/2; 65/13; 65/29; 65/160; 65/163; 356/73.1
[58] Field of Search ................ 65/1, 2, 11 W, 29, 160, 65/163, 13; 356/73.1

[56] References Cited

U.S. PATENT DOCUMENTS 3,982,816  9/1976  Watkins .............................. 356/73.1
4,046,536  9/1977  Smithgall ................................. 65/2

OTHER PUBLICATIONS

"High Speed Non-contact fiber diameter measurement using forward light scattering", Smithgall et al., Applied Optics, vol. 16 #9, Sep. 1977, pp. 2395-2402.

Primary Examiner—Robert L. Lindsay, Jr.
Attorney, Agent, or Firm—William J. Simmons, Jr.; Walter S. Zebrowski

[57] ABSTRACT

The diameter of an optical fiber being drawn is monitored and controlled by an optical measuring technique. An electrical input signal is generated from the fringe pattern produced by directing a laser beam onto the fiber. The input signal is connected to appropriate terminals of first, second, third and fourth comparators. The input signal is delayed 180° to provide an input signal to the remaining two terminals of the first and second comparators and is delayed 90° to provide an input signal to the remaining terminals of the third and fourth comparators. The output pulses from the comparators are shaped, summed and counted to provide a control signal for the fiber drawing apparatus.

4 Claims, 3 Drawing Figures

SYSTEM FOR MEASURING OPTICAL WAVEGUIDE FIBER DIAMETER

BACKGROUND OF THE INVENTION

1. Field of the Invention

This invention relates to a system for measuring the diameter of optical waveguide fibers. More particularly, this invention relates to a circuit for increasing the precision with which such diameter measurements can be made.

The outside diameter of optical waveguide fibers must be precisely controlled since diameter variations can affect connector losses and the attenuation of optical waveguides. Diameter measurements must be performed on-line during the drawing process so that information derived therefrom can be employed to control the draw apparatus. In order to preserve the strength of optical waveguide fibers it is necessary to employ non-contact measurement. Once process disturbances have been eliminated or minimized, the controllability of the fiber drawing process appears to be limited only by the diameter measurement resolution; therefore, this resolution should be maintained as high as possible.

2. Discussion of the Prior Art

U.S. Pat. No. 3,982,816—L. S. Watkins discloses a technique for determining the diameters of successive axial portions of an optical fiber. Such technique, which is typically performed upon an axially advancing fiber during the fiber drawing process, involves the illumination of a newly drawn, axially advancing fiber with a radially directed beam of coherent, monochromatic radiation, thereby creating a forward scattering pattern of interference fringes. The pattern is examined over a predetermined range of scattering angles in order to determine the number of fringes present in the predetermined range. A succession of counts of such fringes provides information as to the diameters of successive axial portions of the fiber advancing past the beam of radiation.

Apparatus for detecting the fringe pattern is disclosed in U.S. Pat. No. 4,046,536—D. H. Smithgall and in the publication, D. H. Smithgall et al. "High-Speed Non-contact Fiber-Diameter Measurement Using Forward Light Scattering" Applied Optics, Vol. 16, No. 9, September, 1977, pp. 2395-2402. Both the Smithgall patent and publication teach a scanned diode array, suitably positioned with respect to the interference fringes, as the apparatus for sensing the presence of the fringes and generating an electrical signal corresponding thereto. The Smithgall publication discloses a circuit for generating pulses corresponding to the number of peaks and valleys in the fringe pattern as well as a counter for determining the fringe count and a microprocesser for converting the count to a fiber diameter display. The Smithgall patent teaches that the output of the counting electronics can be employed to control the speed of the drawing apparatus, thereby reducing the variation between the set point of the control system and the measured diameter indication.

SUMMARY OF THE INVENTION

It is an object of the present invention to provide a fiber diameter measuring circuit having increased measurement resolution.

Another object of this invention is to provide a circuit which is capable of providing an increased number of pulses for each cycle of the fringe pattern detected.

Briefly, the present invention includes a signal processing circuit having a source for providing an input signal having a sinusoidal component. First and second delay circuits are connected to the source, the first delay circuit providing a first delayed signal which is delayed a given amount, and the second delay circuit providing a second delayed signal which is delayed an amount different from the given amount. First and second signal comparing means are respectively connected to the first and second delay circuits, the source being connected to both signal comparing means. The first signal comparing means provides output pulses when the amplitude of the input signal exceeds that of the first delayed signal and when the amplitude of the first delayed signal exceeds that of the input signal. The second signal comparing means provides output pulses when the amplitude of the input signal exceeds that of the second delayed signal and when the amplitude of the second delayed signal exceeds that of the input signal. Means is provided for counting the output pulses from the first and second signal comparing means. The output from the counting means is coupled to a signal utilization apparatus.

In a preferred embodiment, the utilization apparatus controls the drawing of an optical waveguide fiber. Means is provided for directing a beam of light onto the fiber to create a forward scattering pattern of interference fringes. The input signal source comprises a detector for providing an analog signal representative of the interference fringe pattern.

DESCRIPTION OF THE PREFERRED EMBODIMENT

Figure 1:
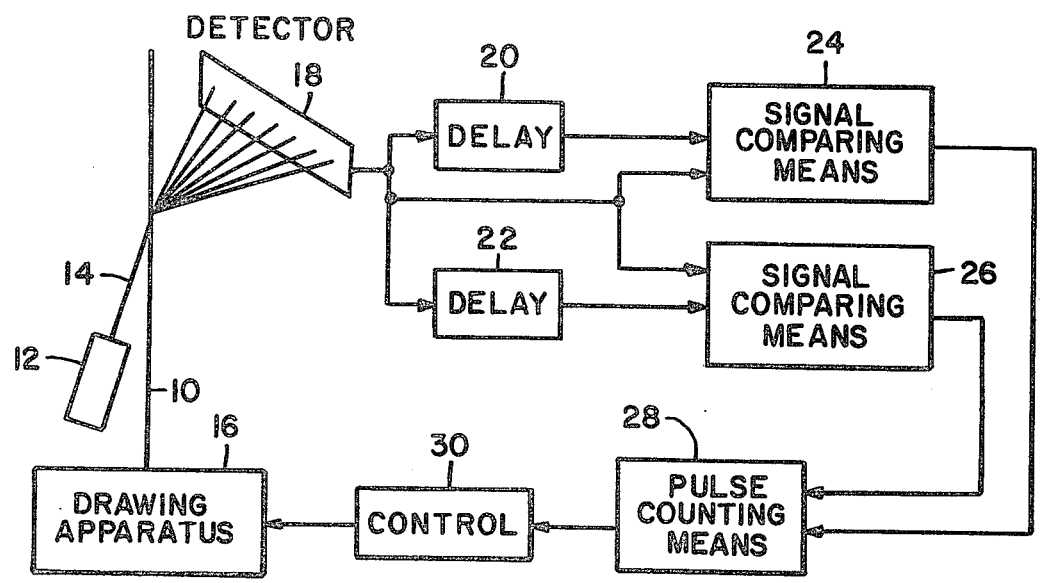
FIG. 1 is a schematic illustration showing certain equipment and circuitry for use in monitoring and controlling the diameter of an optical fiber during the drawing thereof.

FIG. 1 shows a system for monitoring and controlling the diameter of an optical fiber 10. This system includes a source 12 for providing a beam 14 of coherent, monochromatic radiation. As fiber 10 advances axially under the influence of fiber drawing apparatus 16, beam 14 is directed radially onto the fiber. Detector 18, which may comprise a scanned diode array, is suitably positioned to sense the presence of interference fringes in a predetermined range of forward scattering angles across the fiber 10 from source 12.

The detector signal is connected to signal comparing means 24 and 26 and is also connected to comparing means 24 via delay circuit 20 and to comparing means 26 via delay circuit 22. Each of the comparing means 24 and 26 produces a pulse for each peak and a pulse for each valley of the fringe pattern, the pulses from one comparing means being out of phase with respect to the pulses from the other comparing means. The combined function of signal comparing means 24 and 26 is to, in effect, provide one output pulse for each 90° portion of the fringe pattern.

The outputs from the signal comparing means are combined and counted by pulse counting means 28 in order to generate a succession of counts representative of the diameters of successive axial portions of the advancing fiber 10. The successive counts may be subjected to a validation process such as that described in U.S. Pat. No. 4,046,536. The valid diameter indications are provided to control circuit 30 where they are compared with a set point. Control circuit 30 controls the fiber drawing operation by regulating a parameter thereof such as the speed of drawing apparatus 16 in such a manner as to tend to reduce the variation from the set point level.

Figure 2:
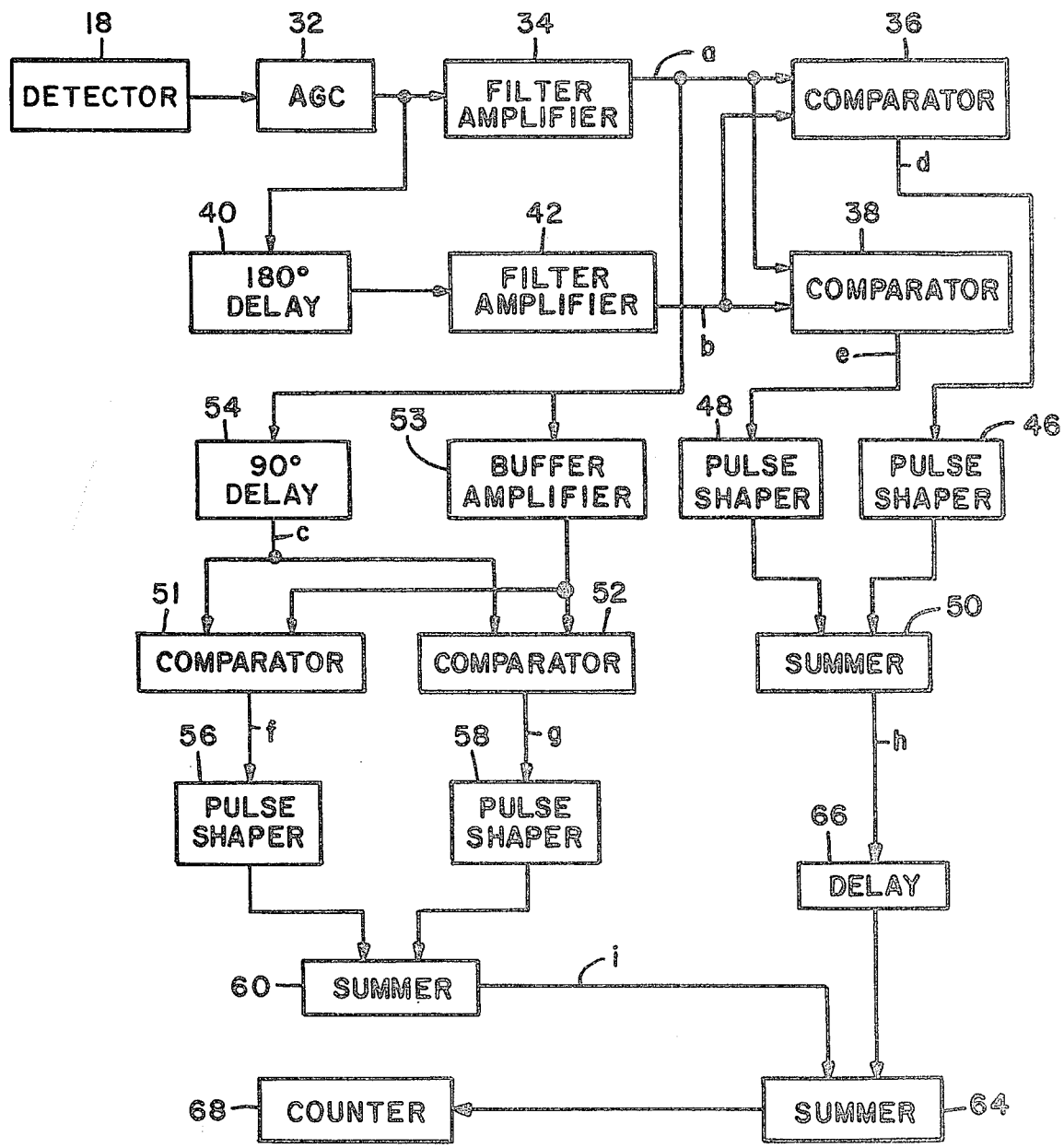
FIG. 2 is a block diagram illustration of a preferred embodiment of the present invention.

The system for processing the output from detector 18 is shown in greater detail in FIG. 2. The locations of the signals represented at FIGS. 3a through 3i are indicated in FIG. 2 by the letters a through i.

The total number of fringes that are contained in a given angular field are imaged by optics (not shown) onto the diode array of detector 18. Mechanical means may be employed to permit only that light which is within the desired angular range of interest to impinge upon the detector.

Detector 18 may consist of a reticon camera containing a photodiode array and its associated electronics. The output of the camera is a sampled and held analog voltage. A commercially available model LC 100 reticon camera employs a diode array containing 1728 elements on 15 μm centers with an aperture of 11 mils. It is a self-scanning array with a serial output. Each silicon photodiode has an associated storage capacitor and a multiplexing switch for periodic feedout via an integrated shift register scanning circuit. It is packaged with a quartz window protecting the photodiode.

The interference pattern is focused onto the diode array which is then scanned and read out on a common output line to provide an analog signal representing the fringe pattern. A discussion and illustration of fringe patterns appears in the aforementioned U.S. Pat. No 3,982,816.

Variations in amplitude across the interference pattern can be such that the amplitude falls off to a level where the signal comparing means cannot resolve the fringes. The analog signal from detector 18 is therefor coupled to automatic gain control circuit 32 which maintains a fairly consistent amplitude across the entire pattern.

The fringe pattern signal is filtered by filter amplifier 34 to provide a signal such as that represented in FIG. 3a. The AGC output is also delayed by 180° delay circuit 40 and filtered by filter amplifier 42 to provide the signal illustrated at FIG. 3b. The filter amplifiers are employed to smooth the box-car waveforms provided by the sample and hold circuit into a sinusoidal form, thereby eliminating clock noise, increasing the amplitude, and AC-coupling the signals to the comparator circuits.

Comparators 36 and 38 compare signals 3a and 3b to indicate the presence of fringes. In comparator 36, signal 3a is the reference voltage and signal 3b is the signal to be compared thereto. Comparator 38 uses signal 3b as the reference and signal 3a as the compared signal. The outputs from comparators 36 and 38 are shown at FIG. 3d and FIG. 3e, respectively. Thus, a positive going pulse is produced when the intensity of the pattern goes from a maximum to a minimum or from a minimum to a maximum.

The outputs from comparators 36 and 38 are connected to pulse shapers 46 and 48, respectively, the outputs of which are coupled to summer 50. Pulse shapers 46 and 48 may consist of one shot multivibrators which provide a short duration output pulse in response to a rise in the input signal. Summer 50 may consist of an exclusive OR gate in which the high signals from both input terminals pass through to provide the output which is illustrated in FIG. 3h.

Figure 3:
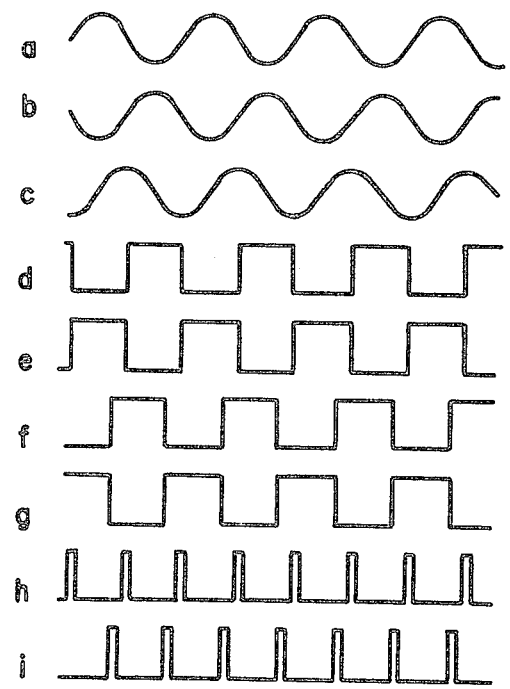
FIG. 3 is a diagram illustrating the signals appearing at various points in the circuit of FIG. 2.

To obtain greater resolution, the circuit of the present invention comprises a second pair of comparators 51 and 52 for detecting a discrete portion of a half fringe. Signal 3a is connected via buffer amplifier 53 to one of the input terminals of each of these comparators, the other input signal to each comparator being amplified and delayed by passing signal 3a through 90° delay 54, the output of which is shown at FIG. 3c. In comparator 51 amplified signal 3a is the reference voltage and signal 3c is the signal being compared. Comparator 52 uses signal 3c as the reference voltage and amplified signal 3a as the compared signal. The output signals from comparators 51 and 52 are shown at lines f and g of FIG. 3, respectively. The output signals from comparators 51 and 52 are connected to pulse shapers 56 and 58, respectively, which perform the same operation as pulse shapers 46 and 48. The output pulses from pulse shapers 56 and 58 are coupled to summer 60, the output of which is illustrated in FIG. 3i. The output from summer 60 is directly coupled to summer 64 whereas the output from summer 50 is coupled to summer 64 by way of delay circuit 66, which delays the pulses from summer 50 an amount sufficient to prevent them from overlapping pulses from summer 60. Delay 66 may be adjustable so that an operator can vary the delay provided thereby while observing the output waveform from summer 64 and positioning the pulses from summer 50 at an optimal spacing between the pulses from summer 60. The pulses from summer 64 are connected to counter 68, the output of which may be used to control the diameter of a drawn optical fiber as shown in FIG. 1.

The disclosed system provides four pulses at the output of summer 64 for each cycle of the signal provided by detector 18. Since this circuit provides twice the number of pulses as the prior art systems, an increase in resolution of measurement is obtained. Therefore, the system of the present invention is capable of controlling fiber diameter to a closer tolerance than that which can be achieved by the prior art.

We claim:

1. A signal processing system in combination with apparatus for drawing an optical fiber comprising means for directing a beam of monochromatic light onto said fiber, thereby creating a light interference patern and light detecting means for producing an electrical signal corresponding to said interference patern, source means providing an input signal having a sinusoidal component, first and second delay circuits connected to said source means, said first delay circuit providing a first delayed signal which is delayed a given amount, said second delay circuit providing a second delayed signal which is delayed an amount different from said given amount, first signal comparing means connected to said source means and said first delay circuit for providing output pulses when the amplitude of said input signal exceeds that of said first delayed signal and when the amplitude of said first delayed signal exceeds that of said input signal, second signal comparing means connected to said source means and said second delay circuit for providing output pulses when the amplitude of said input signal exceeds that of said second delayed signal and when the amplitude of said second delayed signal exceeds that of said input signal, means for counting the output pulses from said first and second signal comparing means, and means for utilizing the output of said counting means.

2. A system in accordance with claim 1 wherein said means for utilizing comprises means for modifying the operation of said drawing apparatus in such a manner as to tend to minimize the difference between the diameter of said fiber and some predetermined desired diameter.

3. A system in accordance with claim 2 wherein said first and second signal comparing means comprises first, second, third and fourth comparators, each having a reference terminal, an input terminal, and an output terminal for providing an output signal of a first level when the signal applied to said input terminal exceeds that at said reference terminal and an output signal of a second level when the signal applied to said reference terminal exceeds that at said input terminal, means for connecting said input signal to the input terminals of said second and fourth comparators and to the reference terminals of said first and third comparators, means for connecting the first delayed signal to the reference terminal of said second comparator and to the input terminal of said first comparator, means for connecting the second delayed signal to the input terminal of said third comparator and to the reference terminal of said fourth comparator, first, second, third and fourth pulse shapers connected to the output terminals of said first, second, third and fourth comparators, respectively, said pulse shapers generating narrow pulses in response to a given change of signal level at the input terminals thereof, first summing means for summing the output pulses from said first and second pulse shapers, and second summing means for summing the output pulses from said third and fourth pulse shapers.

4. A system in accordance with claim 3 wherein said means for counting comprises third summing means for summing the output pulses from said first and second summing means, and a counter connected to said third counting means.

* * * * *